(No Model.)

A. H. WORREST.
FIFTH WHEEL.

No. 488,237. Patented Dec. 20, 1892.

WITNESSES:
Ella L. Gerhart
Geo. A. Lane

INVENTOR
A. H. Worrest
BY Wm. R. Gerhart
ATTORNEY.

UNITED STATES PATENT OFFICE.

ALFRED H. WORREST, OF LANCASTER, PENNSYLVANIA.

FIFTH-WHEEL.

SPECIFICATION forming part of Letters Patent No. 488,237, dated December 20, 1892.

Application filed December 11, 1891. Serial No. 414,732. (No model.)

*To all whom it may concern:*

Be it known that I, ALFRED H. WORREST, a citizen of the United States, residing in Lancaster, in the county of Lancaster and State of Pennsylvania, have invented certain Improvements in Fifth-Wheels, of which the following is a specification.

This invention relates to improvements in that class of fifth-wheels in which the axle moves about the connecting bar of the lower plate thereof with the vertical movements of the free ends of the thills; and the object of the improvement is to connect the fifth-wheel to the axle so as to permit the thills to be rigidly attached to said axle, to avoid the rattling incident to the use of the couplings usually employed.

The invention consists in the construction and combination of the various parts, as hereinafter fully described, and then specifically pointed out in the claims.

Figure 1:
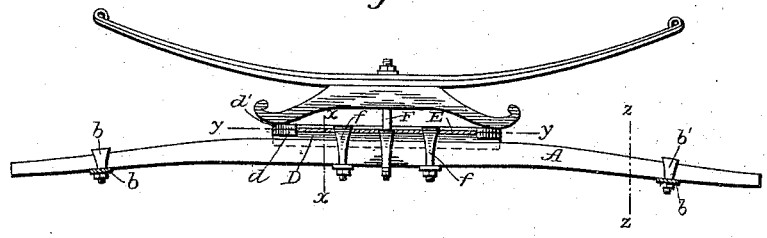
Figure 2:
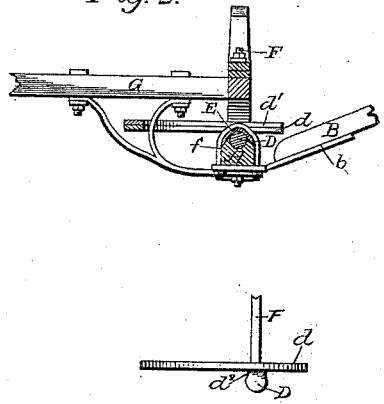
Figure 3:
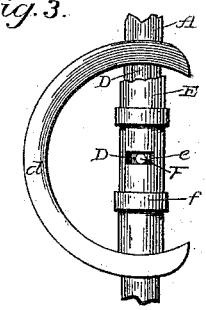
Figure 5:
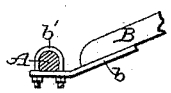
Figure 6:

In the accompanying drawings which form part of this specification, Figure 1 is a front view of an axle with my fifth-wheel attached. Fig. 2 is a transverse section on the broken line $x$—$x$ and Fig. 3 a horizontal section on the broken line $y$—$y$ of Fig. 1. Fig. 4 is a side view of the lower plate of the fifth-wheel detached from the axle, showing an end view of its bearing bar. Fig. 5 is a section on the broken line $z$—$z$, Fig. 1, showing the connection between the axle and one of the thills. Fig. 6 is a top view of the bearing bar of the fifth-wheel, the plate formed therewith being cut away.

Similar letters indicate like parts throughout the several views.

Referring to the details of the drawings, A represents the front axle of a vehicle; B, one of the thills; $b$, the thill-iron, and $b'$ a clip by which the thill-iron is rigidly secured to the axle.

$d$ is the lower plate of the fifth-wheel, and is formed on, and integral with, the bearing $d^2$ of the cylindrical bar D, which rests in a semicylindrical groove or recess in the top of the axle, as shown in Figs. 1 and 2. The king-bolt F is formed on the bearing-bar D or rigidly fastened thereto.

Between the ends of the plate $d$ the bar D is covered by a cap or shield E, having in the top thereof a slot $e$, through which the king-bolt passes, thus permitting free movement of the axle and cap or shield about bar D. The sides of cap E cover the top of the axle to prevent the entrance of dust, dirt and water between bar D and the walls of the groove or recess in the axle. The cap E and bar D are attached to the axle by any ordinary clip, as $f$, whereby the pressure of bar D against the walls of the groove and the pressure of cap E on bar D may be regulated so as to take up the wear of the parts. Top plate $d'$ of the fifth-wheel, the perch G and the connecting parts are secured in the usual manner.

As will readily be understood, the axle turns about the bearing bar D with all vertical movements of the thills, and any lateral movement of the thills in their couplings with the axle is prevented by reason of the way in which said couplings are made, thus avoiding the rattling more or less incident to the employment of the usual hinge-couplings.

Having thus described my invention, what I claim as new and desire to secure by Letters Patent, is—

1. The combination, with an axle, of the lower plate of a fifth-wheel having a circular bar formed on the lower side thereof and engaging a semicircular recess in the top of the axle, a king-bolt connected with said bar, means for retaining the bar in the recess, and thills rigidly connected with the axle, substantially as and for the purpose specified.

2. The combination, with an axle having a semicircular recess formed in the top thereof, of a circular bar engaging the recess and having bearings or posts thereon, the lower plate of a fifth-wheel formed on or with said posts, a king-post connected with the bar, means for retaining the bar in the recess, and thills rigidly connected with the axle, substantially as and for the purpose specified.

3. The combination, with an axle, of the lower plate of a fifth-wheel having a circular bar formed on the lower side thereof and engaging a semicircular recess in the top of the axle, a king-bolt connected with the bar, a cap or shield covering the hinge formed by the bar and axle and having a slot therein through which the king-bolt passes, clips securing the bar and cap or shield to the axle, and thills rigidly connected with the axle, substantially as and for the purpose specified.

A. H. WORREST.

Witnesses:
GEO. A. LANE,
WM. R. GERHART.